Patented Dec. 27, 1949

2,492,907

UNITED STATES PATENT OFFICE 2,492,907

AZO DYES

William Henry von Glahn, Loudonville, N. Y., assignor to General Aniline & Film Corporation, New York, N. Y., a corporation of Delaware No Drawing. Application March 27, 1946, Serial No. 657,606

1 Claim. (Cl. 260—176)

This invention relates to a new class of water insoluble azo dyes. More particularly, it relates to azo dyes of general formula:

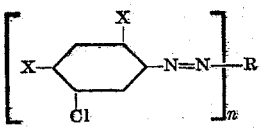

In this formula R stands for the radical of an azo dye coupling component having, prior to coupling, at least one active methylene group, each such group being mono substituted by an azo group after coupling; the X's stand for radicals of the group consisting of methoxy and ethoxy radicals; and $n$ stands for an integer which is equal to the number of active methylene groups originally present in R. The coupling component may contain a number of such active methylene groups. Those containing up to three active methylene groups are common but others may be used.

These new dyestuffs which can be made in substance or on the fiber have high tinctorial values and exceptional fastness properties. They are obtainable by coupling the diazo compound of an amine of the general formula:

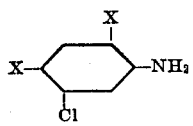

wherein the X's are alkoxy radicals of the group consisting of methoxy and ethoxy groups with a coupling component having an active methylene group and being free of water solubilizing groups such as SO$_3$H and COOH groups. In the production of the pigment, the 1.5-dialkoxy-2-amino-4-chlorobenzene or 5-chloro-2.4-dialkoxy aniline is diazotized in the usual manner and after clarification of the diazo solution it is added to a buffered alkaline solution of the coupling component. When coupling is complete, the reaction solution is acidified and filtered. The resulting pigment is then washed acid free and dried.

For the development of the color on the fiber, textiles of natural or regenerated cellulose or animal fibers may be employed. Of particular interest are cotton and cellulose acetate fibers. Any of the usual ice color processes may be used in the development of the color. In one such process a printing paste is prepared by mixing a diazo amino compound, derived by condensing the diazo of the 1.5-dialkoxy-2-amino-4-chlorobenzene with an amino compound, such as sarcosine, methyl taurine, 2-amino-5-sulfobenzoic acid, proline, N-methyl-glucamine or other amino compound known to be suitable for such purposes, with a coupling component having an active methylene group and being free from water solubilizing groups and adding to the mixture sodium hydroxide, Cellosolve, a thickening agent such as starch or gum tragacanth and water. If desired, such other textile assistants as Turkey-red oil, dispersing agents and solvents may also be added. The fabric is printed by application of the paste in the desired design, drying and introducing the treated fabric to an ager where it is subjected for a short time to the action of steam containing the vapors from volatile organic acid or acids, such as formic and acetic acids. As is well known in this type of printing, the acid vapor splits the amine stabilizer from its combination with the diazo compound and permits the latter to couple with the coupling component present in the printing paste. The design is thus developed in the color of the azo dye resulting from the coupling reaction. The fabric is then rinsed, washed and dried. Alternative methods of development may be employed, such as introducing the printed fabric to a bath containing an acid, such as formic acid, acetic acid or oxalic acid, which bath may also contain other assistants and penetrants.

Whether the color is developed on a fiber by the above outlined method or whether it is produced in substance as a pigment, it is to be understood that any azo dye coupling component containing an active methylene group but having no water solubilizing groups may be used with the 1.5-dialkoxy-2-amino-4-chlorobenzene diazo derivative. As preferred examples of such coupling components, there may be mentioned keto arylamide, 3,3'-dimethyl diacetoacetbenzidide having the formula:

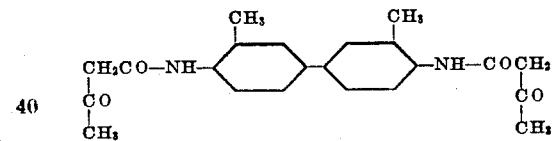

The following example will serve to further illustrate the invention, it being understood, however, that the invention is not limited thereto. Unless otherwise specified, the quantities are given in parts by weight.

Example 1

A printing paste is prepared by mixing:

1.9 parts of the diazo amino compound obtained by condensing a diazo derivative of 5-chloro-2.4-dimethoxy aniline with sarcosine
1.8 parts of diacetoacet-o-tolidide
4.0 parts of monoethylether of ethylene glycol
24.0 parts of water
3.0 parts of sodium hydroxide solution 30%
65.0 parts of gum tragacanth Cotton and rayon piece goods are printed on an engraved roller with this printing paste. The printed material is dried and then treated in an ager for a short time with live steam containing the vapors of acetic acid. The developed prints are then soaped for five minutes in a boiling ½% soap solution, rinsed in clear water and dried. A strong and bright golden yellow shade is obtained which has excellent fastness properties, especially against after-treatment with Rongalit C. The formula of the developed color is:

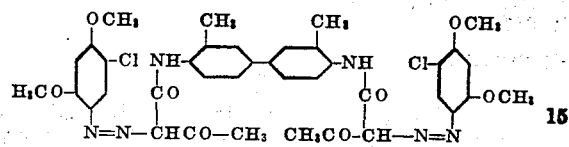

*Example 2*

Prepare a diazo solution of 5-chloro-2,4-dimethoxyaniline.

Add the diazo solution thus prepared to a buffered alkaline solution of 19 grams of diacetoaceto-tolidide.

Acidify the coupling solution with hydrochloric acid, filter, wash acid free and dry.

The product is a strong yellow pigment of excellent fastness properties and has the formula:

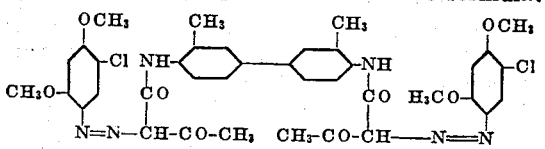

From the foregoing description and illustrative examples, it will be apparent to those skilled in the art that many and various embodiments of the invention may be made without departing from the spirit and scope thereof. It is to be understood that no limitations are intended in the following claim, except those which are specifically recited therein or are imposed by the prior art.

I claim:

The azo dye compound represented by the formula:

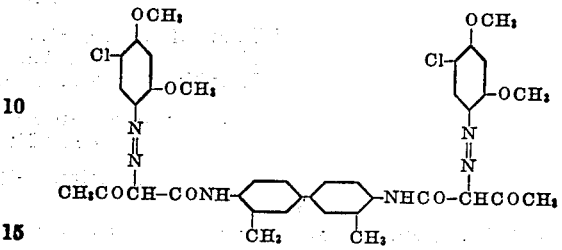

WILLIAM HENRY von GLAHN.

REFERENCES CITED

The following references are of record in the file of this patent:

UNITED STATES PATENTS

| Number | Name | Date |
|---|---|---|
| 1,505,568 | Laska et al. | Aug. 19, 1924 |
| 1,872,033 | Grether | Aug. 16, 1932 |
| 1,915,430 | Laska | June 27, 1933 |
| 1,920,542 | Zitscher et al. | Aug. 1, 1933 |
| 1,933,431 | Henle et al. | Oct. 31, 1933 |
| 2,063,589 | Dahlen et al. | Dec. 8, 1936 |
| 2,112,764 | Dahlen et al. | Mar. 29, 1938 |
| 2,141,667 | Petitcolas | Dec. 27, 1938 |
| 2,154,405 | Lecher et al. | Apr. 11, 1939 |
| 2,185,153 | Lecher et al. | Dec. 26, 1939 |

FOREIGN PATENTS

| Number | Country | Date |
|---|---|---|
| 160,672 | Switzerland | June 1, 1933 |
| 160,673 | Switzerland | June 1, 1933 |
| 336,369 | Italy | Feb. 15, 1936 |